May 17, 1927.  
E. B. CRAFT  
CONDENSER  
Filed Sept. 6, 1922  
1,629,020  
2 Sheets-Sheet 1
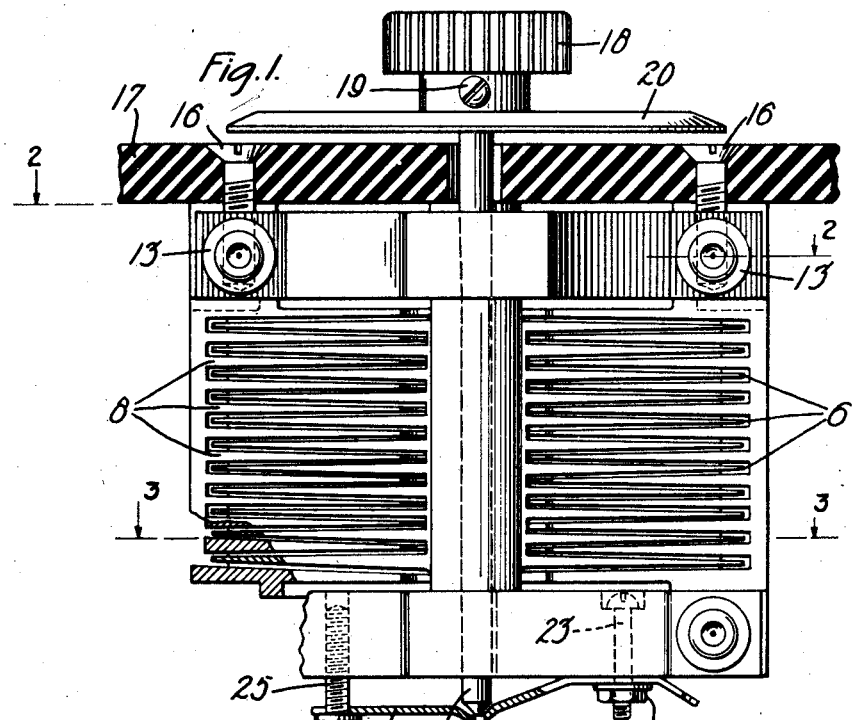
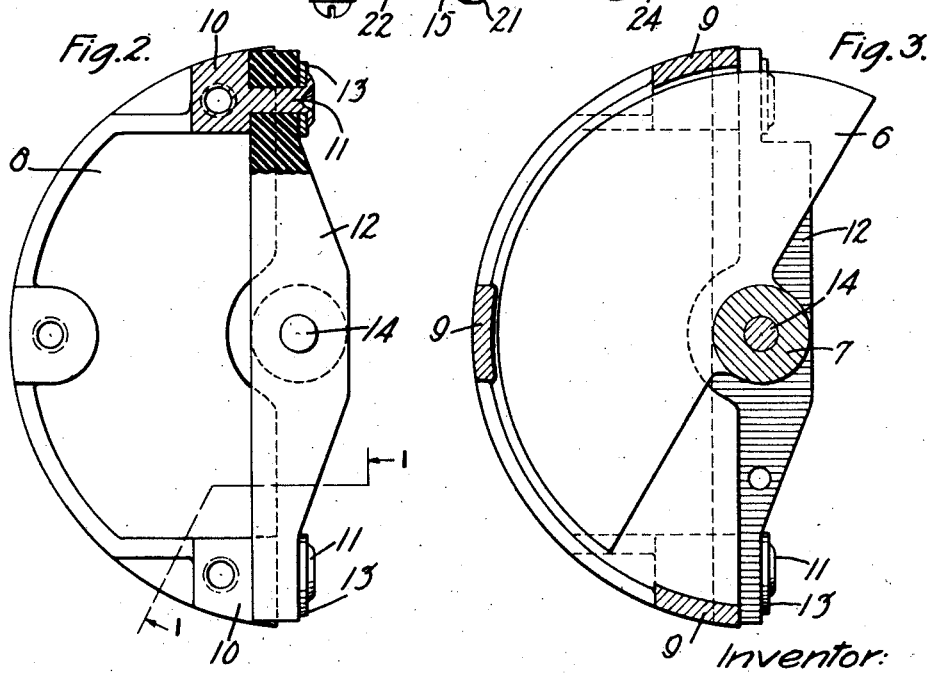
Inventor:
Edward B. Craft.
by Joel Ch. Palmer
Atty.

May 17, 1927.  
E. B. CRAFT  
CONDENSER  
Filed Sept. 6, 1922  
1,629,020  
2 Sheets-Sheet 2

Inventor:  
Edward B. Craft.  
by Joel Ch. Palmer  
Atty.

Patented May 17, 1927.

1,629,020

UNITED STATES PATENT OFFICE.

EDWARD B. CRAFT, OF HACKENSACK, NEW JERSEY, ASSIGNOR TO WESTERN ELECTRIC COMPANY, INCORPORATED, OF NEW YORK, N. Y., A CORPORATION OF NEW YORK.

CONDENSER.

Application filed September 6, 1922. Serial No. 586,418.

This invention relates to condensers of the air type and its object is to provide a condenser of this type in which the rotating member and the fixed member may be easily produced by a die-casting operation and in which the plates formed in the operation will, when in assembled position, have a constant air gap separation in their several positions of relative movement and will be of rigid and sturdy construction.

In the condenser of this invention each of the plates is formed with a radial taper extending from the fixed portion to the free edges thereof whereby when the plates are in assembled position, the air gap between the adjacent faces of the plates of the two sets will be maintained constant and whereby such plates will be of rigid and sturdy construction and may be readily removed from a die in which they are cast.

Figure 4:
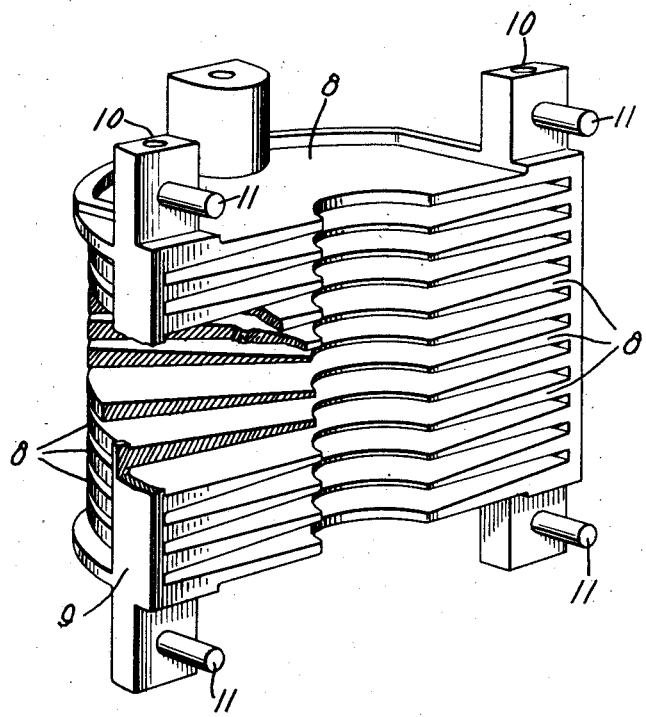
Figure 5:
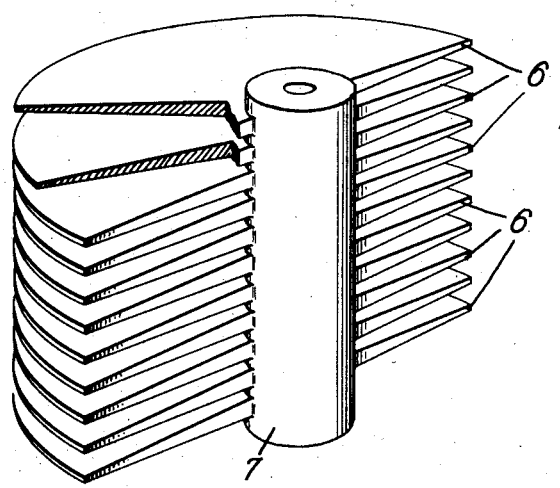

This invention may be more clearly understood by reference to the accompanying drawings in which Fig. 1 is an elevation of a condenser embodying the features of the invention. Fig. 2 is a sectional view along the line 2—2 of Fig. 1. Fig. 3 is a sectional view along the line 3—3 of Fig. 1. Fig. 4 is a view in perspective of the fixed member, a portion of the plates being removed to more clearly show their construction, and Fig. 5 is a perspective view of the rotating member.

Referring to the drawings, the condenser comprises a movable member consisting of plates 6—6 integral with the tubular shaft portion 7 and a fixed member comprising plates 8—8 securely held in position by means of lugs 9—9 cast integral therewith. The outer lugs 9—9 are provided with extensions 10—10 in which are cast studs 11—11. These studs are adapted to be inserted through perforations in bridge members 12—12 and the ends of the studs are then spun over washers 13—13 to secure the bridge members in position. The center of each bridge member 12 is provided with a perforation 14, which serves as a bearing for the shaft 15 which preferably is cast as an insert in the tubular shaft portion 7, but may be attached thereto by any other suitable means. The upper lug extensions 10—10, in addition to serving as supporting means for the insulating bridge member 12, are provided with threaded openings to receive the mounting screws 16—16 by means of which the condenser may be mounted to a panel 17. A knob 18 is attached to the shaft by means of a set screw 19 and a dial 20 is provided to indicate the relative position of the rotating and fixed members. The lower end of the shaft 15 is tapered, as shown, and engages with a cup-shaped portion 21 in the spring member 22. This spring member is rigidly secured to the lower bridge member by means of bolt 23 and nut 24 the bolt passing through a suitable opening in the bridge member. The free end of spring 22 is forked and cooperates with adjusting screw 25 to exert suitable pressure upon the end of shaft 15, thus forcing the tubular shaft portion firmly against the lower portion of upper bridge 12. The plates 6—6 are cast with a radial taper, as shown, in order to provide a rigid and sturdy construction with a minimum thickness of plates. The plates 8—8 are also cast with a radial taper, these plates, however, having their maximum thickness at their outer diameter, in order to secure a uniform air gap between the plates when the members are placed in position.

This construction permits the use of plates of minimum thickness and yet provides a compact structure in which there is a uniform spacing of the plates.

The invention claimed is:

1. A condenser of the air type, comprising a fixed member having a set of plates spaced in fixed relation and of cross section tapering uniformly at all radii toward the center, and a movable member having a similar set of plates tapering uniformly at all radii away from the center, said fixed and movable plates being tapered the same amount to provide uniform air space therebetween when the members are assembled in cooperative relation.

2. An air condenser, comprising a fixed member and a movable member adapted to cooperate therewith, said fixed member including a plurality of parallel plates tapering uniformly at all radii toward the center and having means integral therewith for maintaining the plates in fixed space relation, and said movable member including a shaft member integral with and supporting a plurality of similar plates adapted upon rotation to interleave with the plates of said fixed member, said movable plates being tapered uniformly at all radii away from the center, an amount equal to the inward taper of the fixed plates whereby a uniform air gap is provided between the fixed and movable plates.

3. A condenser of the air type comprising a fixed member having a set of plates spaced in fixed relation and of cross section tapering from their fixed portions to their outer edges uniformly at all radii and a movable member having a set of plates of cross section tapering from their fixed portions to their outer edges uniformly at all radii and a mounting for said movable member whereby it is movable in a direction perpendicular to the direction of taper.

In witness whereof, I hereunto subscribe my name this 30th day of August A. D., 1922.

EDWARD B. CRAFT.